United States Patent

[11] 3,630,003

[72] Inventors  Robert Ashton
 Islington, Ontario;
 Wilbert D. Weber, Nashville, Ontario, both of Canada
[21] Appl. No. 872,629
[22] Filed Oct. 30, 1969
[45] Patented Dec. 28, 1971
[73] Assignee Massey-Ferguson Industries Limited
 Toronto, Ontario, Canada

[54] COOLING ARRANGEMENT FOR COMBINE ENGINE
 6 Claims, 5 Drawing Figs.

[52] U.S. Cl................................................. 55/268,
 55/306, 55/350, 55/385, 55/400, 55/418, 55/467,
 56/12.8, 56/323, 62/243, 98/1, 123/41.33,
 123/41.49, 130/27 R, 165/140, 180/68, 180/69, 180/89
[51] Int. Cl. ...................................................... B01d 46/26
[50] Field of Search............................................. 55/385,
 400, 404, 403, 402, 401, 405, 406, 407, 408, 409,
 290, 267-269, 306, 350, 418, 467; 56/19, 20, 323,
 12.8; 130/27; 62/243, 244; 165/140, 119; 98/1;
 123/41.33, 41.99; 180/68, 69, 89

[56] References Cited
 UNITED STATES PATENTS

| | | | |
|---|---|---|---|
| 1,860,697 | 5/1932 | Traviss | 55/404 X |
| 2,341,771 | 2/1944 | Hagar | 55/403 X |
| 2,484,491 | 10/1949 | Daugherty | 55/290 |
| 2,796,141 | 6/1957 | Schreiner | 180/68 |
| 3,002,585 | 10/1961 | Pasturczak | 55/290 |
| 3,186,389 | 6/1965 | Sylvan | 55/290 X |
| 3,306,067 | 2/1967 | Anglin | 62/243 |
| 3,384,232 | 5/1968 | Turnbull et al. | 209/21 X |
| 3,412,533 | 11/1968 | Robinson, Jr. | 56/12 |
| 3,483,676 | 12/1969 | Sargisson | 55/306 X |
| 3,486,489 | 12/1969 | Huggins | 165/140 X |

FOREIGN PATENTS

| 993,374 | 5/1965 | Great Britain | 56/20 |
|---|---|---|---|

Primary Examiner—Dennis E. Talbert, Jr.
Attorney—Gerhardt, Greenlee & Farris

ABSTRACT: A self-propelled harvester thresher having a grain tank, an engine compartment mounted on top the separator in front of the grain tank, an operator's platform mounted adjacent to one side of the engine compartment, an engine mounted in the engine compartment, a first driven rotary screen mounted on the side of the engine compartment adjacent to the operator's platform, a radiator mounted inside the engine compartment, and a first fan mounted adjacent to the radiator for pulling air through the screen and the radiator and forcing the air to move across the rear portion of the engine compartment and out through a grill in the side of the engine compartment away from the operator's platform. A second fan is mounted on the wall of the engine compartment adjacent to the operator's platform for pulling air through a driven rotary screen and forcing the air to move through the forward portion of the engine compartment. Oil coolers for the hydraulic systems and condensers for air conditioners can be placed adjacent to the fans inside the engine compartment.

INVENTORS
ROBERT ASHTON
BY  WILBERT D. WEBER

ATTORNEYS.

COOLING ARRANGEMENT FOR COMBINE ENGINE

The invention relates to a self-propelled agricultural combine for harvesting and threshing grain crops. More particularly, this invention concerns the construction of the engine compartment and the arrangement of the engine and the various cooling elements for a self-propelled combine.

Various agricultural combine manufactures have placed the engine, for propelling the machine on the ground and for driving the harvesting and threshing assemblies, at various locations on the machine. The combine of this invention has the engine located above the traction drive wheels on top of the separator, in front of the grain storage tank and near the operator's platform. This location of the engine has many advantages over other locations. For example, the weight can be easily supported, power can be easily transferred from the engine to the harvesting and separating mechanisms and the drive wheels, the engine controls and clutch linkages are relatively short and simple, and there is a minimum amount of dust and chaff.

The placement of the engine on top of the separator, in front of the grain tank and adjacent to the operator's platform has created some interrelated problems however. The first problem which must be solved is to properly cool the engine and any other components of the machine which need to be cooled. The second problem is to keep the engine as clear as possible to minimize the chance of fire. The third problem is to keep heat from the engine and the various cooling elements away from the operator's platform while properly cooling the engine and other components of the machine and keeping the engine clean.

To overcome the problems associated with the placement of the engine for a self-propelled combine on top of the separator, in front of the grain tank and adjacent to the operator's platform, the self-propelled combine of this invention includes an engine compartment which encloses the engine. An air intake opening covered by a filter is provided in the side of the engine compartment adjacent to the operator's platform. A radiator and a fan are mounted in the engine compartment adjacent to the air intake. The fan pulls air through the filter and the radiator and forces the air into the engine compartment. The air passes through a grill in the side of the engine compartment away from the operator's platform. If desired, a second fan and filter can be used to circulate additional air into the compartment.

Figure 1:
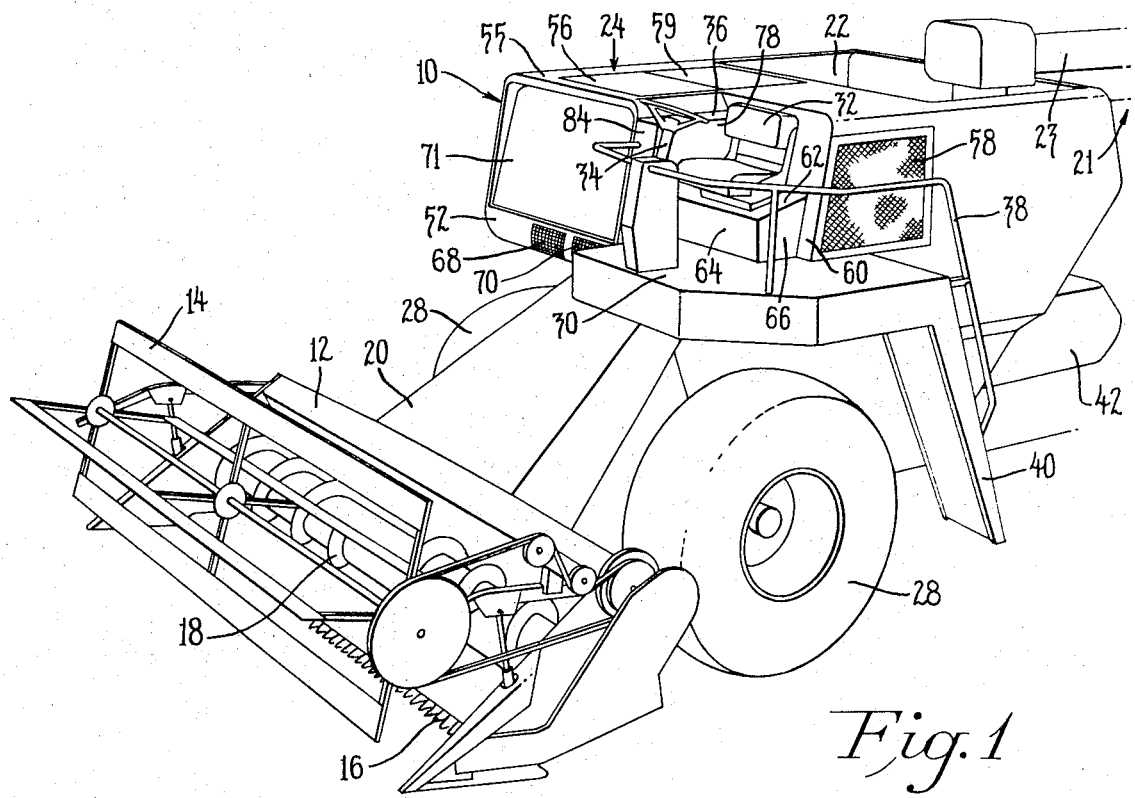
FIG. 1 is a perspective view taken from the left front of a portion of a self-propelled combine employing the engine compartment of the invention.

Turning now to the drawings, there is shown in FIG. 1 a conventional self-propelling combine 10 embodying the present invention. The combine includes a table 12 with a reel 14, a cutter bar 16, and an auger 18. Crops are held by the reel 14, severed by the cutter bar 16 and delivered by the auger 18 to an elevator 20. The elevator 20 conveys the severed crop material to the conventional separator assembly 21 which threshes the crop material and separates and cleans the grain. The grain which has been separated from the other crop material and cleaned is conveyed to the grain tank 22 where it is temporarily stored. The grain tank 22 is a saddle-type tank which straddles the separator assembly 21. A screw conveyor assembly 23 is mounted on the grain tank to convey grain from the grain tank to a truck or other suitable receptacles. An engine compartment 24 is located in front of the grain tank 22 and above the traction drive wheels 28. The operator's platform 30 with a seat 32, a steering assembly 34, a control console 36, a guard rail 38, and a ladder 40 is located on the left side of the machine above one of the traction drive wheels 28 and in front of the grain tank 22. A fuel tank 42 is mounted on the left side of the separator assembly 21 behind the grain tank 22.

Figure 2:
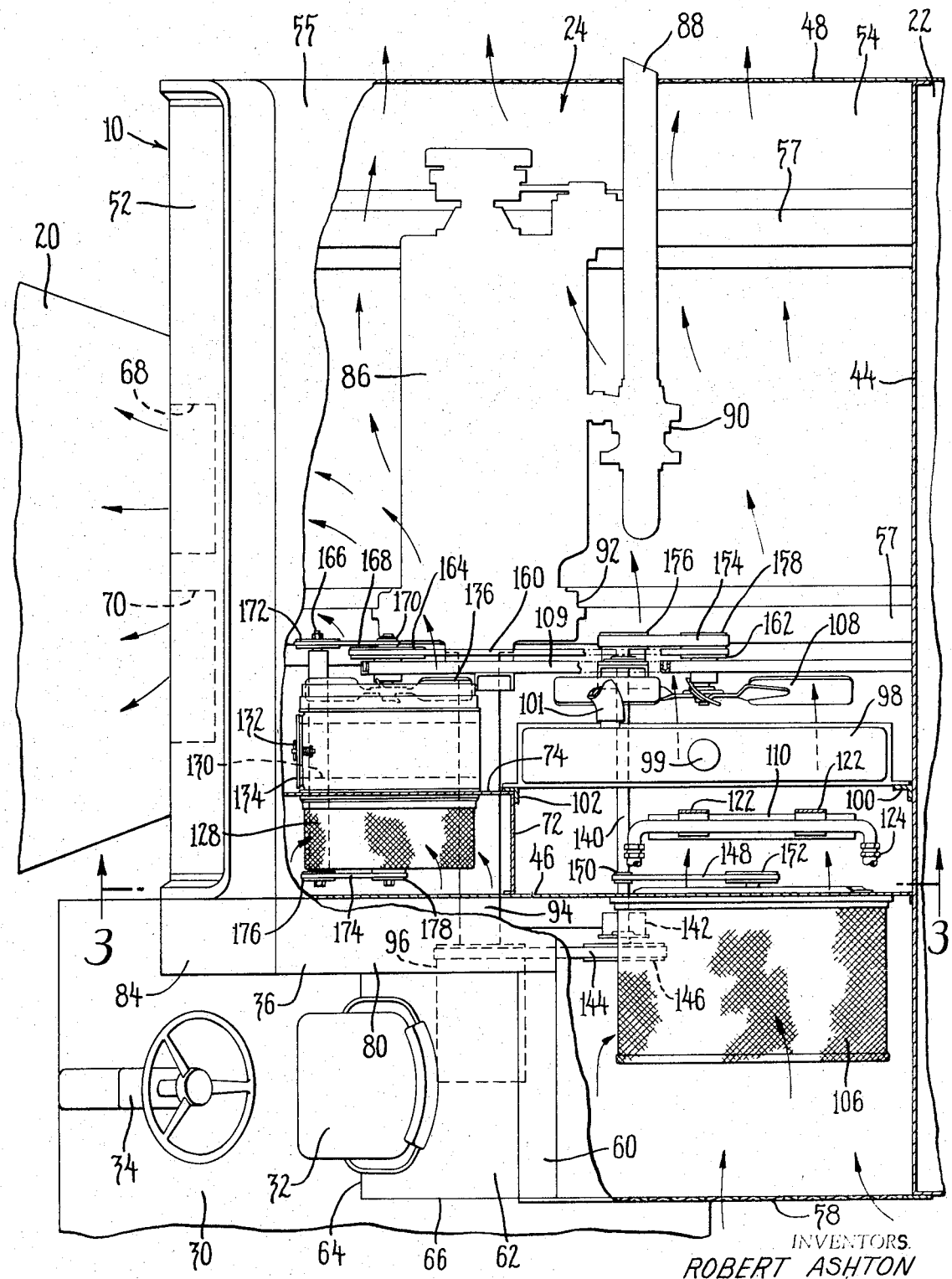
FIG. 2 is an enlarged plan view of a portion of the self-propelled combine of FIG. 1 showing the engine compartment and operator's platform.

The engine compartment 24 as best shown in FIG. 2 has a rear wall 44, a left sidewall 46, a right sidewall 48, a front wall 52, a floor 54 and a top 55. The rear wall 44 of the engine compartment is also a portion of the front wall of the grain tank 22. The floor 54 of the engine compartment, which is approximately the same height as the operator's platform 30, is also the top of the forward portion of the separator assembly. Support members 57 are attached to the floor 54 of the engine compartment 24 to support the various assemblies inside the engine compartment. The right sidewall 48 of the engine compartment is mostly a grill for the passage of air. The top 55 of the engine compartment includes two access lids 56 and 59 which may be opened for servicing the various components inside the compartment. The front wall 52 of the engine compartment is a solid panel except for grill sections 68 and 70 which are provided for the passage of air. Panel 71 of the front wall 52 of the engine compartment may be easily removed to service mechanisms in the compartment.

Figure 5:
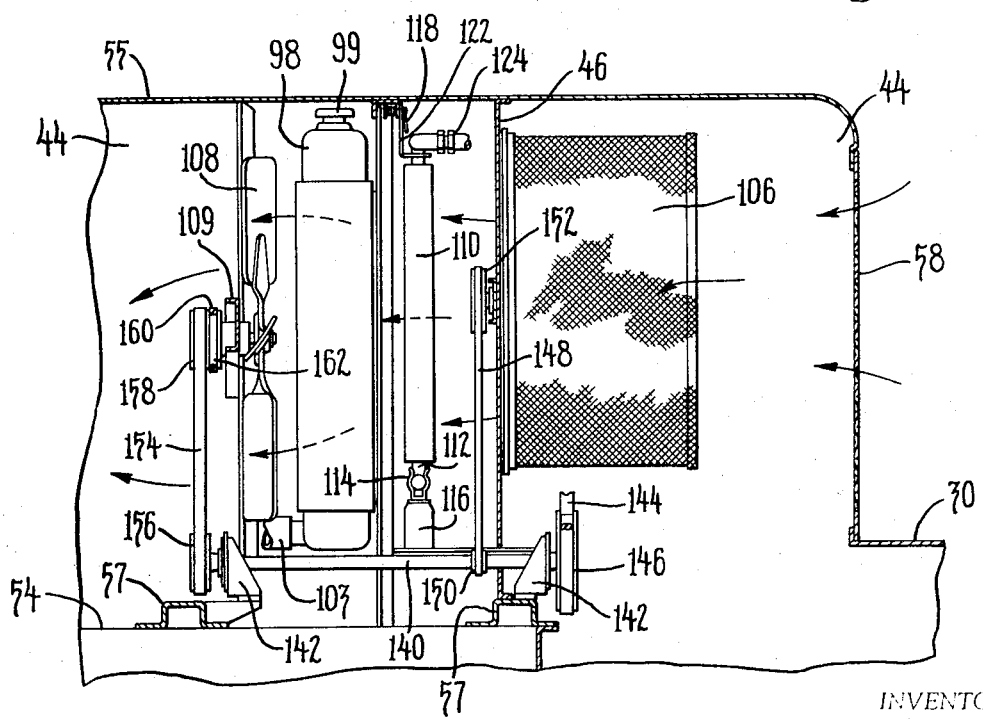
FIG. 5 is a fragmentary sectional view of the left side of the engine compartment taken along lines 5—5 of FIG. 3.

An enclosure is formed to the rear of the operator's seat 32 and on the left side of the engine compartment. The top of this enclosure is an extension of the top 55 of the engine compartment. The rearwall of the enclosure is an extension of the rear wall 44 of the engine compartment 24. The left side of the enclosure is a grill 58 for the passage of air. The front of the enclosure is formed by panels 60, 62, 64 and 66. The bottom of the compartment is open under the operator's platform 30 as best shown in FIG. 5. The operator's seat 32 is supported on panel member 62.

Figure 4:
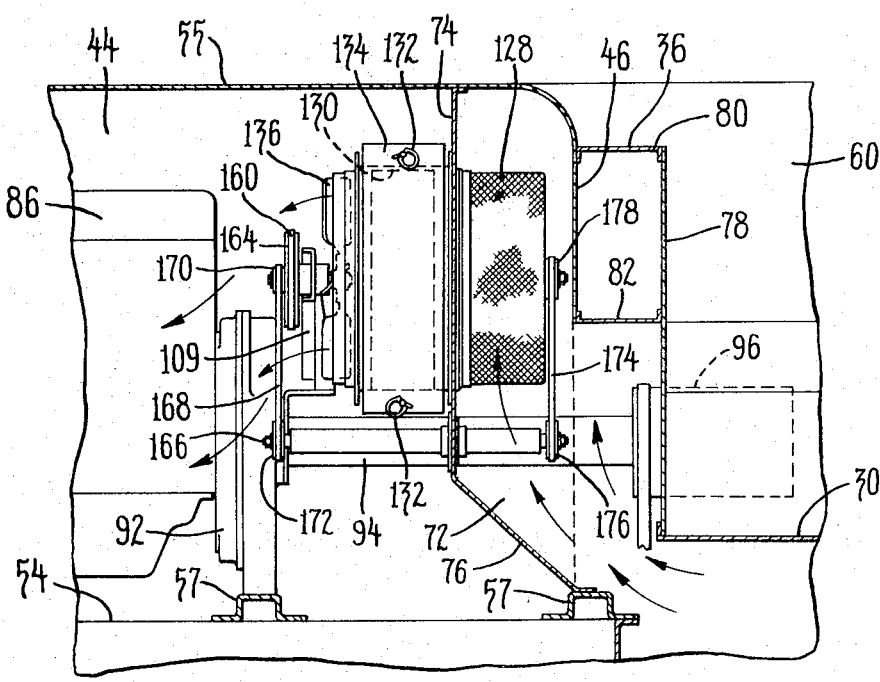
FIG. 4 is a fragmentary sectional view of the left side of the engine compartment taken along lines 4—4 of FIG. 3.

A panel section 72 is attached to the left sidewall 46 of the engine compartment 24 at a point approximately midway between the front and the rear of engine compartment. The panel 72 extends into the engine compartment from the sidewall 46 and from one of the support members 57 to the top 55. A panel section 74 is attached to the panel 72 inside the engine compartment. The panel section 74 extends forward from the panel 72 to the front wall 52 of the engine compartment and from the support member 57 on the floor 54 to the top 55 of the engine compartment. The lower section 76 of the panel 74 extends at an angle as shown in FIG. 4 from the vertical section to a support member 57. The lower section of left sidewall 46 from the panel 72 forward is removed to provide for the passage of air as indicated by the arrows in FIG. 4. Panel 74 with lower section 76 and panel 72 keep the engine compartment enclosed.

A vertical panel 78 extends up from the operator's platform 30 and forward from the panels 62 and 64 to form a wall at the right side of the operator's platform. The panel is spaced from the sidewall 46. The control console 36 is formed by a plate 80 attached to the top of the vertical panel 78 and the side of the sidewall 46. The controls (not shown) extend through the plate 80 of the console. In order to enclose the control console a bottom plate 82 is attached to the bottom of the sidewall 46 and the side of the vertical panel 78. The plate 82 extends forward from the panel 60 to the front section 84 of the control console 36. The front section 84 of the control console is attached to the sidewall 46 of the engine compartment and extends from the plate 80 to the operator's platform. By enclosing the control console, hot air does not blow upon the operator from the holes around the controls.

An engine 86 is mounted in the forward portion of the engine compartment 24 on two of the support members 57. The engine is mounted with the axis of its crankshaft perpendicular to the direction of travel of the harvester. As shown by the outline in FIG. 2, the exhaust pipe 88 extends from an exhaust driven blower 90 on the side of the engine through the right sidewall 48 of the engine compartment 24. A flywheel housing 92 is attached to one end of the engine 86. A drive shaft 94 is attached to the engine and extends from the flywheel housing 92 through the panel 74 to a point outside the engine compartment. A pulley 96 is mounted on the end of the drive shaft 94 in the enclosure to the rear of and below the operator's seat 32. The harvesting and separating assemblies and the drive wheels 28 are driven by the pulley 96. Hydraulic pumps and oil reservoirs and various other assemblies can be placed inside the engine compartment if desired. Some of the assemblies are preferably driven from the end of the engine crankshaft opposite the flywheel housing 92.

Figure 3:
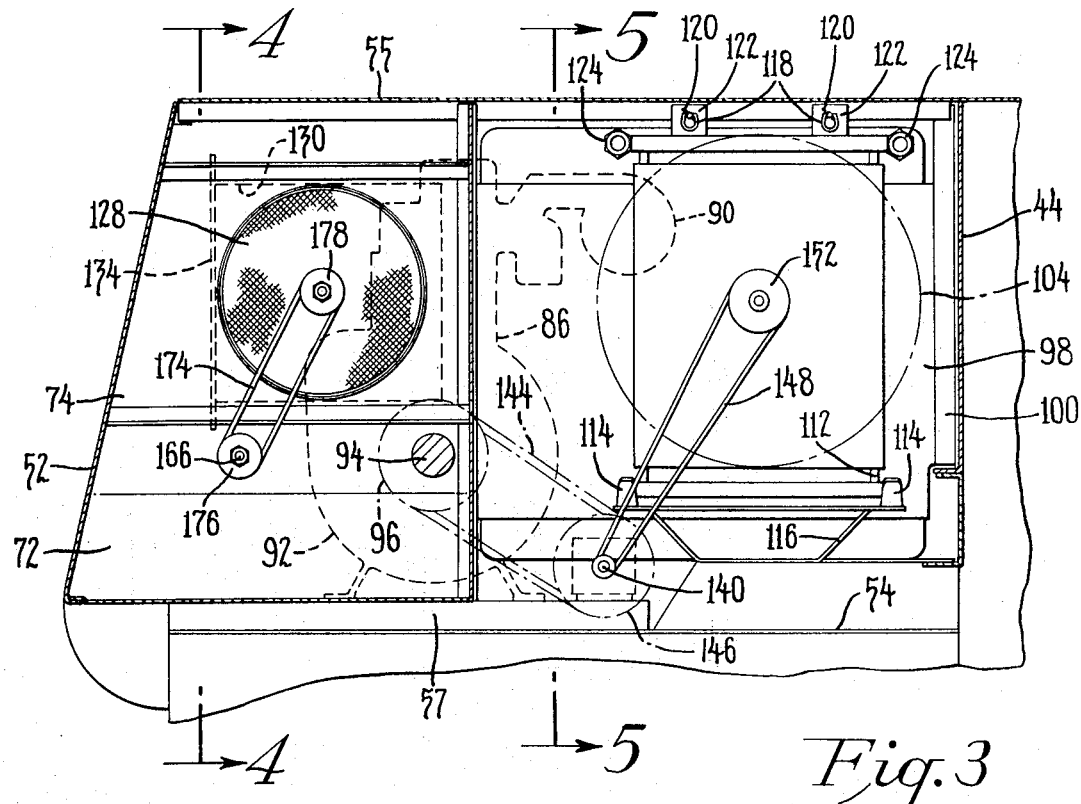
FIG. 3 is a fragmentary sectional view taken along lines 3—3 of FIG. 1.

A radiator 98 for cooling the engine is mounted in the left rear portion of the engine compartment. A bracket 100 is attached to the rear wall 44 of the engine compartment and supports one side of the radiator. Another bracket 102 is attached to the panels 72 and 74 and supports the other side of the radiator 98. Radiator hoses 101 and 103 which are only partially shown conduct water from the radiator 98 to the engine 86 and back to the radiator. Coolant is added to the radiator through the cap 99. A circular opening, indicated by the phantom line 104 in FIG. 3, is provided in the sidewall 46 to allow the passage of air to the radiator 98. A driven rotary screen 106 is mounted outside the engine compartment 24 on the sidewall 46 and inside the compartment between the operator's seat and the grain tank. The screen 106 keeps chaff and straw from being sucked into the engine compartment 24. The straw and chaff, which are thrown from the driven rotary screen 106 by centrifugal force, fall through the open bottom of the enclosure in which the screen 106 is mounted.

Air is pulled through the driven rotary screen 106 and the radiator 98 by a fan 108 rotatably mounted on a support 109 adjacent to the radiator and on the side of the radiator away from the driven rotary screen 106. Suitable baffles which are not shown must be provided to insure that all the air moved by the fan 108 passes through the screen 106 and the radiator 98 and is not recirculated. An oil cooler 110 for cooling the oil used by portions of the hydraulic system such as a hydrostatic transmission is placed in the enclosure between the radiator 98 and the driven rotary screen 106. The air which the fan 108 pulls through the driven rotary screen 106 passes through the oil cooler 110 and then through the radiator 98 as indicated by the arrows in FIG. 2 and FIG. 5. A bottom portion 112 of the oil cooler 110 is secured by a pair of clips 114 which are attached to a support 116. The top of the oil cooler 110 is held by a pair of spring-biased quick-release fasteners 118. When the fasteners 118 are turned into alignment with the slots 120 in the brackets 122, the top of the oil cooler 110 can be moved away from the radiator 98 and then the oil cooler can be lifted through the opening provided by the access lids 56 and 59 and out of the compartment between the radiator 98 and the rotary screen 106 for cleaning. The oil cooler 110 is connected by fasteners 124 to a pair of flexible hoses (not shown) which in turn connect the oil cooler to the hydraulic system. There is sufficient slack in the flexible hoses to allow the oil cooler to be completely removed from the engine compartment.

A second driven rotary screen 128 is mounted on the left-hand side of panel section 74 slightly to the front of panel 72. An enclosure 130 is mounted on the right-hand side of the panel section 74 so that it surrounds the opening in the panel section 74 behind the rotary screen 128. A pair of spring-biased quick-release fasteners 132 hold a cover 134 on the enclosure 130. A fan 136 is rotatably mounted on a support 109 in an opening in the right side of the enclosure 130. The fan 136 pulls air under the operator's platform 30 into the duct formed by sidewall 46 and panels 74, 76 and 78, through the rotary screen 128 and into the enclosure 130. A heat transfer device such as a condenser may be mounted in the enclosure 130 in a manner similar to the mounting of oil cooler 110. The heat transfer device could be removed from the enclosure 130 through the opening covered by cover 134 for cleaning. The air pulled through the rotary screen 128 by the fan 136 is forced into the engine compartment as indicated by the arrows in FIG. 4.

A countershaft 140 is rotatably supported by brackets 142 attached to support members 57 below the radiator and to the rear of the engine. The countershaft 140 is driven by a belt 144 which passes around the pulley 96 on the output shaft 94 of the engine and around a pulley 146 on the left end of the countershaft 140. The driven rotary screen 106 is driven by a belt 148 which passes around a pulley 150 on the countershaft 140 and a pulley 152 on the shaft which supports the rotary screen 106. The fan 108 is driven by a belt 154 which passes around the pulley 156 on the countershaft 140 and pulley 158 on the shaft that supports the fan 108. The fan 136 is driven by a belt 160 which passes around the pulley 162 on the shaft which supports the fan 108 and pulley 164 on the shaft which supports the fan 136. A countershaft 166 driven by a belt 168 which passes around pulley 170 on the shaft which supports the fan 136 and pulley 172 on the right end of countershaft 166. The rotary screen 128 is driven by a belt 174 which runs around pulley 176 on the left-hand end of countershaft 166 and pulley 178 on the shaft which supports the rotary screen 128.

In operation the fan 108 pulls air in through grill 58. The air then passes through driven rotary screen 106 which separates the chaff. The air which passes through rotary screen 106 passes through the oil cooler 110 and the radiator 98 for cooling the engine. The fan 108 then forces the air into the engine compartment 24 where it passes past the rear side of the engine to the grill formed in the right sidewall 48 of the engine compartment as indicated by the arrows in FIG. 2. The fan 136 pulls air from under the operator's platform 30 through a passageway between the engine compartment 24 and the panel section 78 of the operator's platform, through a driven rotary screen 128 and into the enclosure 130 as indicated by the arrows in FIG. 4. The air passes through a condenser in the enclosure 130 past the fan 136 and into the engine compartment. The air forced into the engine compartment by the fan 136 passes on the front side of the engine through grill sections 68 and 70 in the front of the engine compartment and through the grill formed in the right sidewall of the engine compartment. The air which passes through the grill section 68 and 70 travels toward the table 12 and helps keep dirt and chaff from the table 12 off the top of the elevator 20 and away from the operator's platform and the air intakes for the engine compartment.

The fans 108 and 136 pull air into the engine compartment from locations adjacent to the operator's platform 30 and exhaust the air from the engine compartment through a grill formed in the right sidewall 48, grill 68, and grill 70 at locations away from the operator's platform thereby keeping heat from the engine compartment away from the operator's platform. All the air passing into the engine compartment 24 must pass through either driven rotary screen 106 or 128 which insure that all the air entering the engine compartment is free from material which could increase the danger of fire in the engine compartment. The fans 108 and 136 both force air into the engine compartment thereby slightly pressurizing the engine compartment. This positive pressure inside the engine compartment 24 helps insure that all the air entering the engine compartment passes through one of the rotary screens and keeps dirt and chaff from entering the engine compartment through openings which are not covered either by the screen 106 or the screen 128. Due to the location of the air passages which provide for the passage of air to the rotary screens 106 and 128, none of the metal panels adjacent to the operator or the operator's platform are exposed to the relatively hot air found inside the engine compartment.

We claim:

1. In a self-propelled combine having a frame with a table and a separator mounted on the frame for performing conventional crop harvesting and treating operations, and traction drive wheels and steerable wheels to support the frame, the combination including: a grain tank for temporary storage of grain mounted on the frame, an operator's platform mounted on the frame, an enclosed engine compartment with a front wall, two sidewalls and a top wall mounted on the frame above the traction drive wheels, on top of the separator, in front of the grain tank and adjacent to one side of the operator's platform, a liquid cooled engine mounted in the engine compartment, an output shaft connected to the engine for propelling the combine and for driving the table and separator, at least two air intake openings on the side of the engine compartment adjacent to the operator's platform, at least two fans for moving air through the air intake openings, into the engine compartment, a radiator mounted in the rear portion of the engine compartment between a first one of the fans and a first one of the air intake openings, an enclosure between the radiator and said first one of the air intake openings, a heat exchanger secured in the enclosure between the radiator and said first one of the air intake openings, at least two rotary screens driven by the engine to filter the air which passes through the air intake openings on the side of the engine compartment adjacent to the operator's platform, a second enclosure mounted in the forward portion of the engine compartment between a second one of the air intake openings and a second one of the fans, a heat exchanger secured in the second enclosure, and at least one opening on the side of the engine compartment away from the operator's platform for the passage of air out of the engine compartment.

2. A self-propelled combine including a frame, a separator mounted on the frame, a grain tank mounted on the frame, traction drive wheels to propel the combine and support the forward portion of the frame, steerable wheels to steer the combine and support the rear portion of the frame, an engine compartment mounted on the frame above the separator in front of the grain tank and above the traction drive wheels, a liquid cooled engine mounted in the engine compartment with the axis of its crankshaft perpendicular to the direction of travel of the combine, an operator's platform mounted adjacent to one side of the engine compartment above the traction drive wheels and forward of the rear wall of the engine compartment, an air intake in the side of the engine compartment adjacent to the operator's platform, a rotary screen to filter the air entering the engine compartment through said air intake mounted on the frame to rear of the operator's platform, a radiator mounted in the rear portion of the engine compartment adjacent to the air intake, a fan mounted in the engine compartment adjacent to the radiator for pulling air through the rotary screen and the radiator and for forcing the air into the engine compartment to pressurize the engine compartment, and at least one opening on the side of the engine compartment away from the operator's platform for the passage of air out of the engine compartment and away from the operator's platform.

3. The combine of claim 2 including a second air intake opening in the side of the engine compartment adjacent to the operator's platform, a fan to pull air through the second air intake and a rotary screen to filter the air entering the engine compartment through the second air intake opening.

4. The combine of claim 2 wherein the rotary screen is driven by the engine.

5. The self-propelled combine of claim 2 including an enclosure between the radiator and the air intake in the side of the engine compartment adjacent to the operator's platform, and a heat exchanger secured in the enclosure by clips and quick release fasteners.

6. The self-propelled combine of claim 2 including at least one opening in the front portion of the engine compartment, for the passage of air out of the engine compartment positioned so as to induce a flow of air between the engine and the front wall of the engine compartment and to direct the air passing through the opening toward the front of the combine and away from the operator's platform.

* * * * *